United States Patent [19]
Briggs

[11] Patent Number: 5,473,907
[45] Date of Patent: Dec. 12, 1995

[54] HEAT PUMP WITH SUPPLEMENTARY HEAT

[76] Inventor: Floyd Briggs, P.O. Box 577, Oak Hill, Fla. 32759

[21] Appl. No.: 345,812

[22] Filed: Nov. 22, 1994

[51] Int. Cl.[6] .................................................. F25B 27/00
[52] U.S. Cl. ........................................ 62/238.7; 62/324.1
[58] Field of Search .............................. 62/324.1, 324.6, 62/238.7; 165/29; 237/2 B

[56] References Cited

U.S. PATENT DOCUMENTS

| | | | |
|---|---|---|---|
| 3,563,304 | 2/1971 | McGrath | 165/2 |
| 3,589,437 | 6/1971 | Shoji et al. | 165/29 |
| 3,768,274 | 10/1973 | Fink | 62/159 |
| 4,037,649 | 7/1977 | Hartka | 165/16 |
| 4,106,308 | 8/1978 | Miller | 62/324 |
| 4,257,239 | 3/1981 | Partin et al. | 62/238.7 |
| 4,528,822 | 7/1985 | Glamm | 62/238.7 |
| 4,646,537 | 3/1987 | Crawford | 62/238.7 X |
| 4,856,578 | 8/1989 | McCahill | 165/29 |
| 4,918,933 | 4/1990 | Dyer | 62/79 |
| 5,211,023 | 5/1993 | Matsuura | 62/117 |
| 5,291,941 | 3/1994 | Enomoto et al. | 165/62 |
| 5,305,614 | 4/1994 | Gilles | 62/238.7 |
| 5,323,844 | 6/1994 | Sumitani et al. | 165/29 |
| 5,327,743 | 7/1994 | Coltrin | 62/279 |

FOREIGN PATENT DOCUMENTS

| | | |
|---|---|---|
| 1162917 | 2/1984 | Canada. |
| 39315 | 11/1981 | European Pat. Off.. |
| 322705 | 7/1989 | European Pat. Off.. |
| 259370 | 10/1990 | Japan. |
| 280808 | 10/1993 | Japan. |
| 2180329 | 3/1987 | United Kingdom. |

*Primary Examiner*—William E. Tapolcai
*Attorney, Agent, or Firm*—Richard C. Litman

[57] ABSTRACT

An improved heat pump having supplementary electric heat and a bypass feature protecting the outside coil from icing. The heat pump operates conventionally during space cooling. When employed for heating purposes, operation is conventional above the critical ambient temperature below which the heat pump is ineffective. Below this critical ambient temperature, an electric heater heats refrigerant which then proceeds through a conventional vapor compression and heat exchange cycle. However, frigid gaseous refrigerant coming from the indoor coil then bypasses the outdoor coil, and is conducted directly to the heater. Valves isolate the bypass when it is not in use. The bypass prevents the outdoor coil from icing, so that no energy need be expended for de-icing. It also enables rapid switching from supplementary to air based heat source operation, when weather conditions fluctuate. The heater preferably comprises a heating element which threads into a liquid chamber formed in the heater body. The liquid chamber absorbs heat and passes the heat to a refrigerant chamber formed in the heater body. The heating element may be renewed without interrupting the pressurized refrigerant circuit. The resultant heat pump is independent of combustion based supplementary heating, and is sufficiently compact to be provided as a window unit.

8 Claims, 4 Drawing Sheets

| | SUMMER | WINTER | | CONTROLLER |
| | | NORMAL | COLD | |
|---|---|---|---|---|
| V1 | SUMMER | WINTER | WINTER | MASTER SWITCH |
| V2 | SUMMER | WINTER | WINTER | MASTER SWITCH |
| V3 | SUMMER | WINTER | WINTER | MASTER SWITCH |
| V4 | NORMAL | NORMAL | BYPASS | CRITICAL TEMP |
| V5 | BYPASS | NORMAL | BYPASS | CRITICAL TEMP |
| V6 | SUMMER | WINTER | WINTER | MASTER SWITCH |
| HEATER | OFF | OFF | ON | CRITICAL TEMP |

HEAT PUMP WITH SUPPLEMENTARY HEAT

BACKGROUND OF THE INVENTION

1. Field of the Invention

The present invention relates to an improvement to heat pumps employed alternatively for heating and cooling. In the heating mode, refrigerant gas bypasses the evaporator coil when ambient temperatures are extremely low, below temperatures required for efficient heating operation. Supplementary heat is provided by an electric resistive element enveloped within a liquid bath. The refrigerant circuit passes through and absorbs supplementary heat from the liquid bath.

2. Description of the Prior Art

Employment of vapor compression heat transfer devices for both heating and cooling has become commonplace. As applied to space heating and cooling for residences and other occupied buildings and spaces, such devices are generally termed heat pumps. A heat pump typically includes a refrigerant circuit including a compressor and two heat exchangers.

The present invention is directed towards the heating and cooling of living spaces, and the discussion of the prior art will proceed with this in mind. Therefore, the term "heat pump" will be employed. It will further be assumed that heat is rejected to or drawn from ambient air. In theory, heating is merely a reversal of cooling, or air conditioning operation. However, practical experience has shown that firstly, there is a critical ambient temperature for all known commercially available heat pumps. Below this critical temperature, heat pumps cannot abstract sufficient heat from the atmosphere to satisfy heating requirements. Substitute or supplementary heat sources must be called into play to maintain occupied spaces at satisfactory temperatures.

A second problem is that in the heating mode, when certain ambient temperature and humidity conditions exist, the heat exchanger in communication with the atmosphere will suffer from deposition of ice on its external surfaces. This ice effectively insulates against heat transfer, and the heat pump becomes ineffective.

These problems are well known, and various strategies have been set forth to remedy the same. Supplementary heat is generally employed to heat the occupied space, as illustrated in the examples below. It has also been prior art practice, although not illustrated herein by prior art examples, that heat is applied to remove ice deposited upon heat exchangers.

Heat pumps and air conditioners, which refer to vapor compression devices which move heat only from within a building to the ambient, exist as unitary devices, or window units, or as split systems. In a typical split system, the compressor and one heat exchanger are furnished as one unit, which is set in place on a concrete slab outside the building being heated and cooled. The second heat exchanger, together with a powered fan for forcing air and a duct system for distributing conditioned air, is located within the building. The two heat exchangers are connected by power and control electrical lines, and conduits of a refrigerant circuit.

A window unit has practical limitations which do not necessarily arise in a split system. Both location of the window unit and the size of the window unit require independence from cumbersome external heating devices, and especially from combustion based heating devices. A window unit is intended to be portable, and the permanent utility connections which are generally required for fuel supply, combustion air supply, and the like interfere with the practicality of a window unit.

As the present invention provides improvement to generally well known heat pumps and allied devices, the following patents will generally illustrate the art.

U.S. Pat. No. 3,589,437, issued to Kunihiro Shoji et al. on Jun. 29, 1971, teaches a heat pump having an electric heating element disposed in-line within a refrigerant chamber or conduit. The present invention avoids direct exposure of a heating element with the refrigerant.

U.S. Pat. No. 3,563,304, issued to William L. McGrath on Feb. 16, 1971, describes a liquid receptacle buried in the ground proximate a building. A refrigerant circuit passes through water contained within the receptacle for transfer of energy. The liquid is heated by an electric resistive heater extending thereinto. In the present invention, the liquid is an intermediate heat transfer medium rather than a storage medium. As will be gleaned from the accompanying specification, it would not be feasible to employ a separate, buried liquid receptacle with the heat pump of the present invention.

U.S. Pat. No. 3,768,274, issued to James K. Fink on Oct. 30, 1973, shows bypassing a condensing coil to control the amount of cooling of air forced through the evaporator coil. Another bypass for temperature control is seen in U.S. Pat. No. 5,211,023, issued to Takaaki Matsuura on May 18, 1993. Circulation of refrigerant through heat exchangers other than the condensing and evaporating coils is selectable. In the present invention, the condensing coil is not bypassed, and no additional air-to-refrigerant heat exchangers are employed.

The precise combination of components employed in the present invention is not shown in the prior art.

None of the above inventions and patents, taken either singly or in combination, is seen to describe the instant invention as claimed.

SUMMARY OF THE INVENTION

The present invention primarily concerns heat pumps for heating and cooling occupied spaces. Furthermore, in a preferred embodiment, the novel heat pump is furnished as a unitary device for being placed in the window of a room, which will be referred to hereinafter as a window unit.

The window unit must provide a supplementary heat source to overcome ineffectiveness of a heat pump in extreme cold. It must also cope with the problem of ice based obstruction of the heat exchanger communicating with ambient air. For brevity, this heat exchanger may be referred to as the outdoor coil, and the heat exchanger communicating with the air of the occupied space may be termed the indoor coil.

The present invention comprises a heat pump having a critical temperature sensing thermostat, and a bypass conduit bypassing the outdoor coil. In the heating mode, refrigerant gas of elevated temperature is passed through the indoor coil, heat being surrendered by refrigerant to the point of condensation of the refrigerant to the liquid phase. Liquid refrigerant is vaporized in an expansion valve, and passes to one of two heat sources.

If the ambient temperature is above the critical temperature, then the ambient air is selected as the heat source, and heats frigid refrigerant in the gaseous phase. This heated gas passes to the compressor, the compressed gas being of elevated temperature. Compressed gas then flows to the indoor coil to start a new cycle.

However, if the ambient temperature is below the critical temperature, then the critical temperature thermostat operates selected valves to bypass the outdoor coil, and also energizes a supplementary electric heat source.

The electric heater comprises a heating element immersed in a liquid bath around which frigid refrigerant passes. The refrigerant circuit is segregated from the liquid bath, but is in heat exchange relation therewith. This arrangement enables servicing of a defective heating element without disruption of the pressurized refrigerant circuit.

Thus, the novel heat pump provides supplementary heat when extreme cold ambient temperatures so require. The supplementary heat is independent of combustion fuels, and the requirement to supply combustion air and to provide heat insulation protecting the building from objectionable temperatures generated by combustion equipment is absent. No exhaust system is required, and the same electrical circuit serving the fan and compressor motors may also serve the electric heater.

The problem of ice obstruction of the outdoor coil is avoided rather than created and solved. Since removal of ice from the typically intricate outdoor coil is generally accomplished by application of heat, energy is conserved by avoiding icing of the outdoor coil.

The novel arrangement also offers versatile operation, in that maximal operation without supplementary heat is enabled. Because winter temperature and humidity conditions are subject to rapid fluctuation, it is desired to keep the outdoor coil free of ice, so that the heat pump an quickly change from supplementary heat to ambient air as a heat source. This rapid switching enables maximal use of ambient heat, and minimizes reliance upon relatively expensive electric heat.

Immersion of the heating element in the liquid bath and in eventual communication with the refrigerant circuit also satisfies additional needs. The thermal mass provided by the liquid bath and its receptacle mitigate rapid switch on and off of the heating element.

Also, imposing heat upon the refrigerant circuit rather than, for example, exposing the heating element to air discharged into the room entails certain advantages. Liquid immersion of the heating element minimizes exposure of environmental objects to extreme heat which could cause fires, protects the heating element from temperature extremes with place thermal stresses upon the same, and defeats the tendency of a heater exposed to air from attracting airborne contaminants. When first energizing a contaminated heating element, the contaminants will tend to burn, and objectionable odors and products of combustion are discharged into the space being heated.

Accordingly, it is a principal object of the invention to provide a heat pump which has an integral supplementary heat source to cope with extremely low ambient temperatures.

It is another object of the invention to prevent icing of the outdoor coil.

It is a further object of the invention to enable rapid switching between the ambient air heat source and the supplementary heat source.

Still another object of the invention is to avoid location of a heating element in an airstream discharged into occupied space.

An additional object of the invention is to remain independent of combustion heat sources.

It is again an object of the invention to provide a heat pump having supplementary heat in as compact a package as possible.

Yet another object of the invention is to separate a heating element from the refrigerant circuit.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
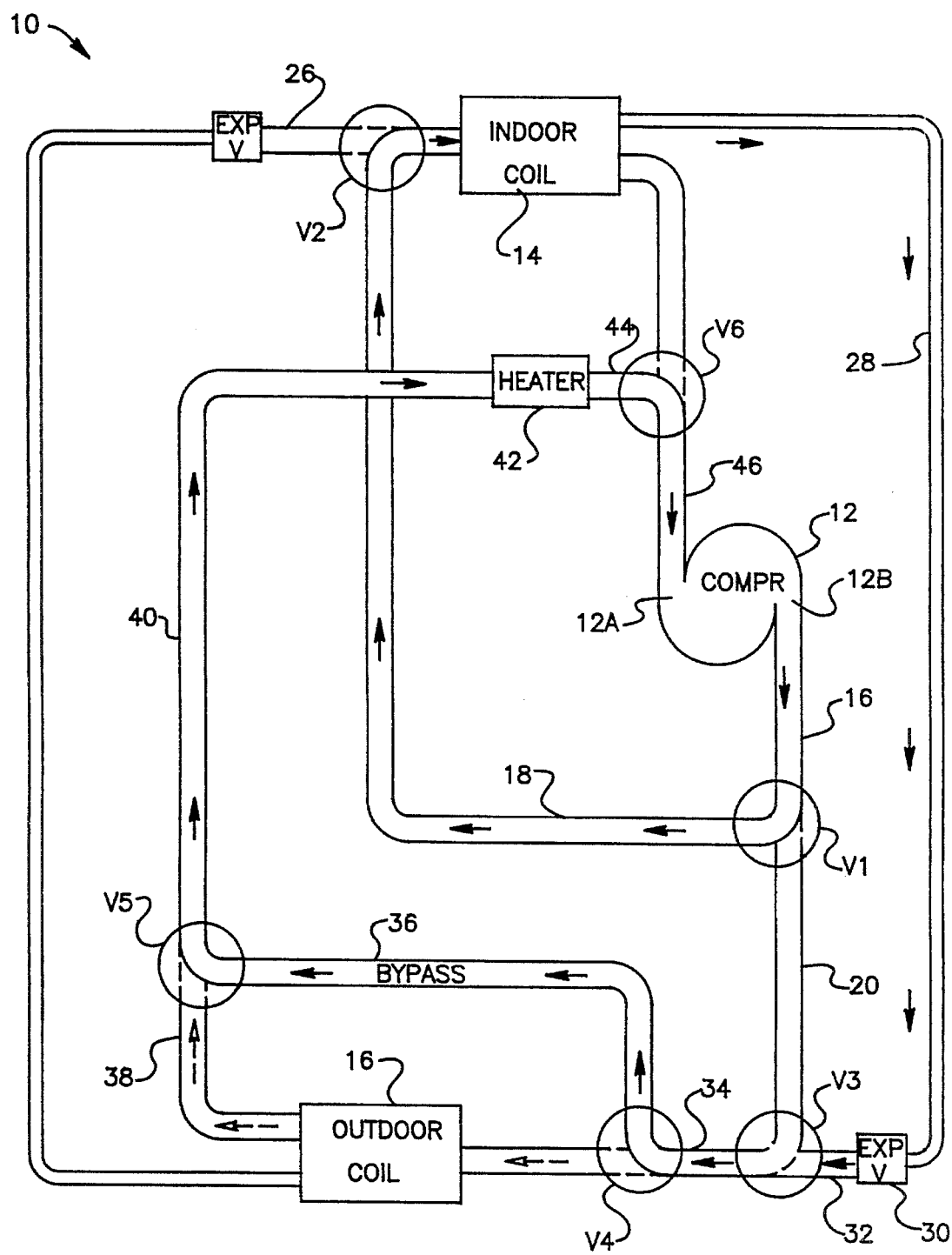
FIG. 1 is a diagrammatic representation of the principal components and fluid circuit of the novel heat pump, showing operation in a heating mode.

Turning now to FIG. 1 of the drawings, operation of the novel heat pump 10 in the heating mode is discussed. Heat pump 10 includes the usual compressor 12 having a suction side 12A and a discharge side 12B, indoor coil 14 which is in heat exchange relation with air of the occupied space, and outdoor coil 16 which is in heat exchange relation with ambient air. The refrigerant circuit for heating occupied space proceeds as follows. Arbitrarily commencing at compressor 12, compressed refrigerant at elevated temperature passes to indoor coil 14. Conduit 16 of the heating circuit is controlled by a first valve V1, which selectively diverts refrigerant from conduit 16 to a subsequent heating circuit conduit 18 or to a cooling circuit conduit 20. In the heating mode, valve V1 passes refrigerant to conduit 18, and obstructs communication between conduits 16 and 18, on the one hand, and cooling circuit conduit 20.

Figures 3, 4:
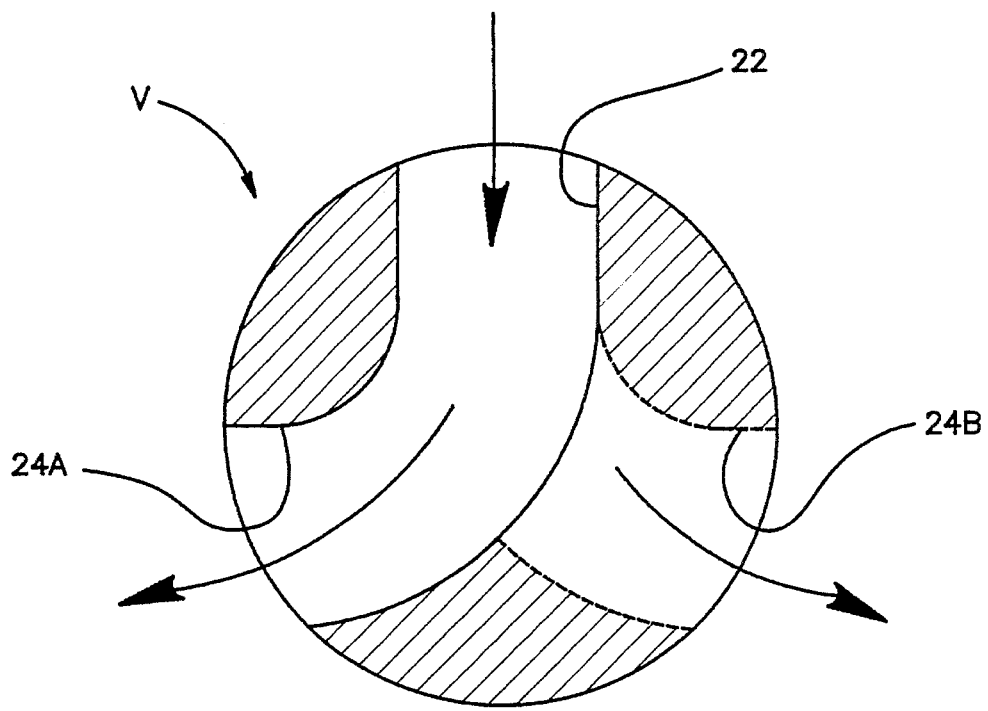
FIG. 3 is a diagrammatic detail view of a valve representative of those of FIGS. 1 and 2, drawn to enlarged scale.
FIG. 4 is a table showing the required conditions of the valves controlling the fluid circuit, with respect to the various heating and cooling modes.

The valving arrangement discussed above is described in terms of a three-way valve, or a valve having three orifices for connection to conduits. Operation of this type of valve is set forth in further detail in FIG. 3. A representative three-way valve V has an inlet orifice 22 and two outlet orifices 24A,24B. Only one of the outlet orifices is in fluid communication with the inlet orifice. The other outlet orifice is obstructed from communication with both the inlet orifice and the outlet orifice presently communicating with the inlet orifice.

Fluid flow is described in terms of a singular inlet, although direction of flow may be opposite. In the latter case, there are two inlets and a single outlet, and the separation of the orifices described above is maintained.

Valves exist in a great many varieties and configurations, and the depiction and description of operation based upon three-way valves, which are employed typically throughout both heating and cooling circuits in the present invention, is merely a convenience for explanatory purposes. Valves may be two-way, wherein the valve is normally open or normally closed, or may be a compound valve incorporating many segregated passageways therethrough, or may be of still other configurations. Obviously, a three-way valve may be replaced by other such valves to the same effect, provided the logic of circuitry is maintained. For this reason, valve operation will be described in terms of direction of circuit flow which results, and not by opening and closing, or energizing the solenoid of individual valves. The complete control scheme is set forth in the table of FIG. 4.

Returning to FIG. 1, conduit 18 is connected to a second valve V2, which selectively admits refrigerant from conduit 18 or from a cooling circuit conduit 26. Valve V2 routes the refrigerant to indoor coil 14, wherein heat is transferred to air forced through indoor coil 14 by a blower (not shown) and into the room being heated. Cooled refrigerant exiting indoor coil 14 passes through a conduit 28.

It is contemplated that sufficient heat will be removed from refrigerant in indoor coil 14 so that condensation occurs. Therefore, liquid refrigerant is conducted by conduit 28 to an expansion valve 30. It is possible to design a heat pump in which phase change does not occur, in which case expansion valve 30 is omitted from the refrigerant circuit. An extension 32 of conduit 28, of increased diameter to accommodate the increased volume of refrigerant vapor emitted from expansion valve 30 conducts this refrigerant, now considerably cooled by expansion, to a heat source.

Depending upon ambient temperatures, one of two heat sources will be selected. All commercially available heat pumps are subject to inefficient operation below a critical temperature particular to a specific heat pump design. This critical temperature can be calculated or determined by experimentation. For purposes of controlling heat pump 10, the predetermined critical temperature may vary from a measured or calculated value. This is because the critical temperature roughly coincides with the freezing point of water. Below the freezing point of water, tendency of water to condense on the frozen outdoor coil 16 becomes a significant possibility, and it is desired to avoid chilling this coil to avoid icing as well as heat pump operation reaching the point of cost ineffective operation.

When it is determined that ambient temperatures are below this predetermined critical temperature, a supplementary heat source is selected.

Conduit 32 leads to a third valve V3, which selectively receives refrigerant from conduit 32 during heating, or from conduit 20 during cooling operation. In the heating mode, refrigerant passes from conduit 32 through valve V3 to a conduit 34, then to a fourth or bypass control valve V4. At ambient temperatures below the critical temperature, valve V4 admits refrigerant from conduit 34 and discharges the same to a bypass conduit 36. Monitoring of ambient temperatures is accomplished by a thermostat, (not shown) and subsequent control functions of the thermostat will be described hereinafter. Bypass conduit 36 leads to a fifth valve V5, which controls the other end of bypass conduit 36, and is therefore a second bypass control valve.

If the ambient temperature is above the critical temperature, valve V4 would selectively divert incoming refrigerant to outdoor coil 16. Recalling that refrigerant was considerably chilled following evaporation at expansion valve 30, heat is absorbed from ambient air forced through outdoor coil 16. Warmed gaseous refrigerant is then conducted by a conduit 38 to valve V5.

Valves V4 and V5 operate similarly, so that refrigerant flows selectively either through outdoor coil 16 or through bypass conduit 36 disposed parallel to outdoor coil 16.

Refrigerant discharged from valve V5 is conducted in a conduit 40 to a heater 42. At ambient temperatures below the critical temperature, upon which case refrigerant has bypassed outdoor coil 16, heater 42 is energized, thus heating the refrigerant. Heated refrigerant passes through a conduit 44, through a sixth valve V6, and is conducted by a conduit 46 to compressor suction side 12A. At this point, the cycle is complete, and a new vapor compression cycle begins.

An overview of the heating circuit is provided by reference to arrows which indicate direction of refrigerant flow. Bypassing operation is indicated by arrows having solid lines and filled arrowheads, which arrow appearance is typical throughout the balance of the circuit. Normal heat pump operation, in which refrigerant passes through outdoor coil 16, is indicated by arrows shown in broken line, and having unfilled arrowheads.

The positions of valves V1, V2, V3, and V6 are illustrated in FIG. 1 in their respective winter positions. Valves V4 and V5 are shown in their bypass positions, employed at ambient temperatures below the critical temperature. In the heating mode at ambient temperatures above the critical temperature, valves V4 and V5 move to the normal position (see FIG. 2).

Figure 5:
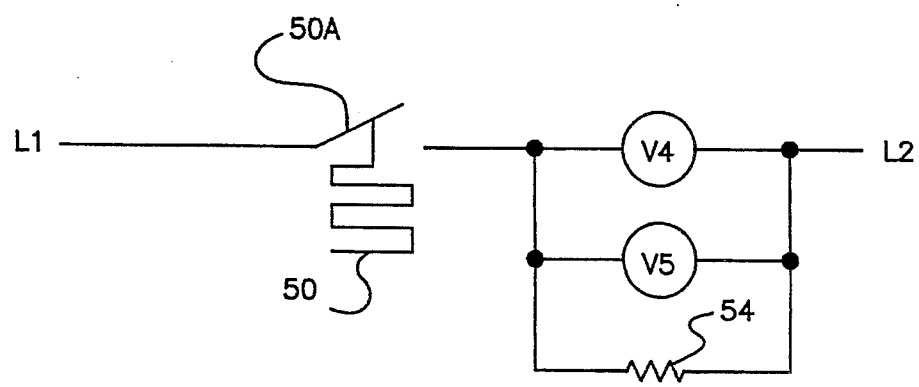
FIG. 5 is an electrical schematic showing control of valves and the heating element as operated during cold weather.

As mentioned before, a thermostat is provided to monitor ambient temperatures. As shown in FIG. 5, thermostat 50 has an associated switch 50A controlling an electrical control circuit, wherein a voltage potential exists between lines L1 and L2. Closure of switch 50A, which will occur when ambient temperatures are less than the predetermined critical temperature, energizes electrical heating element 54 of heater 42 (shown in its entirety in FIG. 1). Closure also operates valves V4 and V5 into the condition depicted in FIG. 1, which will be termed the bypass position. Thus, heater 42 provides heating, and refrigerant bypasses outdoor coil 16, at ambient temperatures below the critical temperature.

Figure 6:
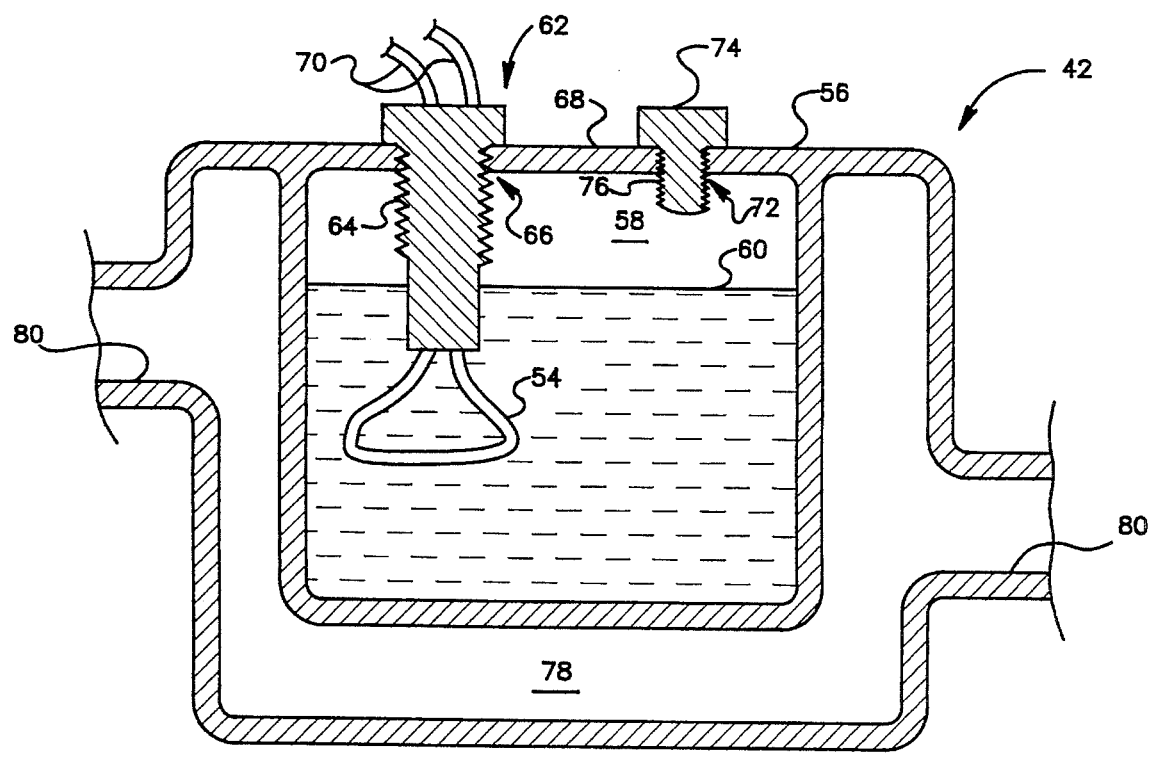
FIG. 6 is a cross-sectional detail view of the chamber enclosing the heating element in a liquid bath, drawn to enlarged scale.

A preferred construction of heater 42 is shown in FIG. 6. A housing 56 defines two separated chambers. The inner chamber is a liquid chamber 58 partially filled with liquid 60. A heater element assembly 62 having threads 64 is tightened into a corresponding threaded heater hole 66 formed in the wall 68 of housing 56. Assembly 62 includes heating element 54 immersed in liquid 60 and electrical conductors 70 for connection to the circuit shown in FIG. 5, or its equivalent. Assembly is thus threadedly and removably installed within heater 42.

Housing 56 further includes a threaded access hole 72. A plug 74 having corresponding threads 76 closes access hole 72. Access to the interior of liquid chamber 58 is provided by removing plug 74. This access may prove useful in draining or filling chamber 58, or for otherwise servicing heater 42.

Housing 56 is constructed to provide a refrigerant chamber 78 which is in heat exchange relation to liquid chamber 58. Inlet and outlet orifices 80 enable heater 42 to be placed in series in fluid communication with the heating mode refrigerant circuit. Thus, heating element 54 will heat liquid 60. Heat will be transferred to refrigerant passing through chamber 78.

Intimate contact with relatively dense liquid 60 absorbs heat so readily that extreme temperatures at element 54 are avoided, and its service life thus prolonged. The air partially filling chamber 58 serves as an expansion chamber accommodating varying volume of liquid 60 which will occur as the temperature thereof changes.

In the cooling mode, wherein the occupied space is cooled and heat is rejected to ambient air, a second refrigerant circuit is employed. The second or cooling circuit reverses the roles of indoor and outdoor coils 14,16 as is conventionally performed in heat pumps, and will be discussed primarily with respect to implications regarding the various valves.

Figure 2:
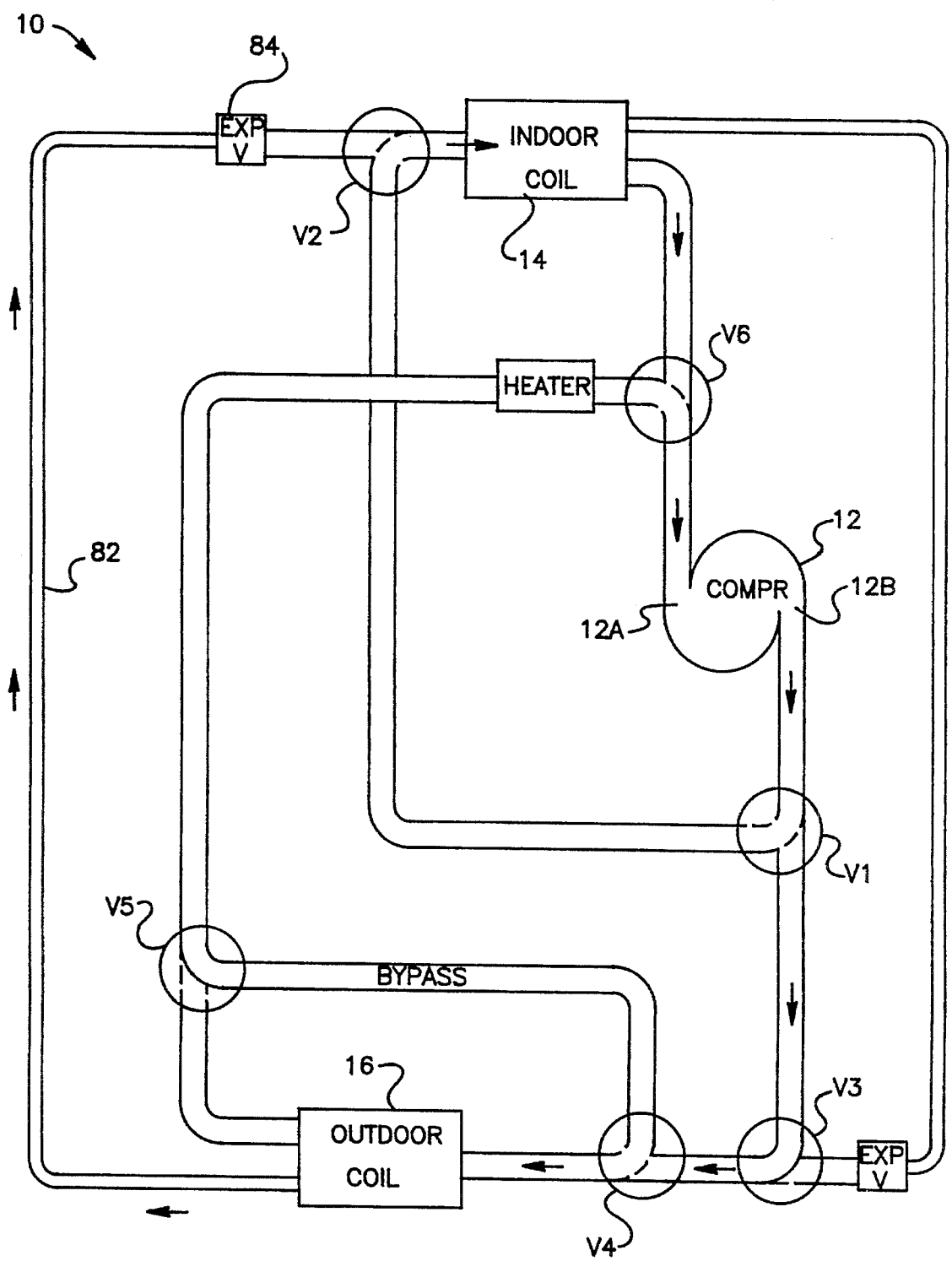
FIG. 2 is a diagrammatic representation similar to FIG. 1, but showing operation in a cooling mode.

Turning now to FIG. 2, it will be observed that the components recited in FIG. 1 are repeated. In the cooling mode, refrigerant gas at elevated temperature exits compressor 12 at 12B, and passes to outdoor coil 16, where heat is rejected to ambient air. Cooled, condensed refrigerant flows in conduit 82 to expansion valve 84. Refrigerant chilled by expansion then enters indoor coil 14 where it absorbs heat from the occupied space. Warmed refrigerant then returns to suction side 12A of compressor 12 to start a new cycle.

In the cooling mode, valves V1, V2, V3, and V6 are in their alternate or summer positions, when compared to the positions of the heating mode illustrated in FIG. 1. Bypass control valve V4 remains in the position employed for heat pump operation during cooling or normal position. Bypass control valve V5 is in its bypass position, this position being illustrated in FIG. 1. This valve position arrangement prevents any significant amount of refrigerant from taking unintended paths through the various conduits, which unintended paths could reduce effectiveness of operation.

It will thus be seen that for heating purposes, the novel bypass arrangement avoids icing of the outdoor coil, so that no energy need be expended to remove ice therefrom, and so that switching of heat sources from electric supplementary heat to ambient heat can be accomplished quite rapidly.

The liquid bath imparts a degree of thermal mass for evening out temperature fluctuations. Yet the novel heat pump remains sufficiently compact so as to promote practice of the invention as a unitary, window mounted device. The heater is readily serviceable, and does not require disturbance of the highly pressurized refrigerant circuits to remove the heating element or the liquid.

While the invention has been set forth as a heat pump which reversibly heats and cools an occupied space, it will be understood also to apply to devices providing only heating functions.

It is to be understood that the present invention is not limited to the sole embodiment described above, but encompasses any and all embodiments within the scope of the following claims.

I claim:

1. A heat pump having supplementary heat comprising:
   a compressor for compressing refrigerant, having a suction side and a discharge side;
   a first heat exchanger disposed in heat exchange relation with ambient air;
   a second heat exchanger disposed in heat exchange relation with air of an occupied space;
   a bypass conduit disposed in parallel with said first heat exchanger;
   a heater having an electric heating element, in heat exchange relation with refrigerant flowing in a refrigerant circuit;
   a first refrigerant circuit for heating an occupied space, comprising conduits conducting refrigerant from said compressor discharge side to said second heat exchanger, then conducting refrigerant selectively to one of said second heat exchanger and said bypass conduit, then conducting refrigerant to said heater, and then conducting refrigerant to said compressor suction side;
   at least one bypass control valve controlling said first refrigerant circuit to conduct refrigerant from said compressor discharge side selectively to one of said first heat exchanger and said bypass conduit;
   said heater comprising means defining a liquid chamber partially filled with liquid, an electric heating element disposed within said liquid chamber and immersed in said liquid, and means defining a refrigerant chamber disposed in heat exchange relation to said liquid chamber and in fluid communication with said first refrigerant circuit, whereby refrigerant within said first refrigerant circuit passes through said refrigerant chamber and absorbs heat generated by said heating element;
   said liquid chamber further having a wall defining a threaded access hole therein and a plug having corresponding threads, whereby access to said liquid chamber for filling the same is obtained by removing said plug; and
   a second refrigerant circuit for cooling the occupied space, comprising conduits conducting refrigerant from said compressor discharge side to said first heat exchanger, then conducting refrigerant to said second heat exchanger, and then conducting refrigerant to said compressor suction side.

2. The heat pump according to claim 1, further comprising at least one bypass control valve disposed within said first refrigerant circuit, admitting refrigerant flowing from said second heat exchanger, and selectively diverting the refrigerant to a conduit conducting the refrigerant to one of said first heat exchanger and said bypass conduit.

3. The heat pump according to claim 2, further comprising
   a first valve disposed within said first refrigerant circuit after said compressor discharge side, for selectively diverting refrigerant from said first refrigerant circuit to said second refrigerant circuit;
   a second valve disposed within said first refrigerant circuit selectively admitting refrigerant from one of said first refrigerant circuit and said second refrigerant circuit, and discharging admitted refrigerant to said second heat exchanger;
   a third valve disposed within said first refrigerant circuit, selectively admitting refrigerant from one of said first refrigerant circuit and said second refrigerant circuit, and discharging admitted refrigerant into a conduit conducting the refrigerant to a fourth valve;
   said at least one bypass control valve comprising a fourth valve disposed within said first refrigerant circuit, admitting refrigerant flowing from said third valve, said fourth valve selectively diverting the refrigerant to a conduit conducting the refrigerant to one of said first heat exchanger and said bypass conduit, and a fifth valve disposed within said first refrigerant circuit, selectively admitting refrigerant flowing from one of said first heat exchanger and said bypass circuit, and discharging the refrigerant to a conduit conducting refrigerant to said heater; and a sixth valve disposed within said first refrigerant circuit, selectively admitting refrigerant from one of a conduit conducting refrigerant from said heater, and a conduit of said second refrigerant circuit conducting refrigerant from said second heat exchanger, said sixth valve discharging refrigerant to a conduit conducting refrigerant to said compressor suction side.

4. The heat pump according to claim 3, further comprising:

an electrical control circuit controlling said heater, said fourth valve and said fifth valve;

a thermostat disposed in operative relation to ambient air, including a switch responsive to a predetermined critical temperature, said switch controlling said control circuit to energize said heater and to control said fourth valve and said fifth valve to cause refrigerant flowing within said first refrigerant circuit to flow to a conduit conducting the refrigerant to one of said first heat exchanger and said bypass conduit, and then to flow to said heater.

5. The heat pump according to claim 1, said heater comprising a heater element assembly having threads for threading to said heater, said liquid chamber having a wall defining a threaded heater hole therein for receiving said heater element threads, whereby said heater element is threadedly and removably installed within said heater.

6. A heat pump having supplementary heat comprising:

a compressor or compressing refrigerant, having a suction side and a discharge side;

a first heat exchanger disposed in heat exchange relation with ambient air;

a second heat exchanger disposed in heat exchange relation with air of an occupied space;

a bypass conduit disposed in parallel with said first heat exchanger;

a heater having an electric heating element, in heat exchange relation with refrigerant flowing in a refrigerant circuit;

a first refrigerant circuit for heating an occupied space, comprising conduits conducting refrigerant from said compressor discharge side to said second heat exchanger, then conducting refrigerant selectively to one of said second heat exchanger and said bypass conduit, then conducting refrigerant to said heater, and then conducting refrigerant to said compressor suction side;

at least one bypass control valve controlling said first refrigerant circuit to conduct refrigerant from said compressor discharge side selectively to one of said first heat exchanger and said bypass conduit;

a second refrigerant circuit for cooling the occupied space, comprising conduits conducting refrigerant from said compressor discharge side to said first heat exchanger, then conducting refrigerant to said second heat exchanger, and then conducting refrigerant to said compressor suction side;

a first valve disposed within said first refrigerant circuit after said compressor discharge side, for selectively diverting refrigerant from said first refrigerant circuit to said second refrigerant circuit;

a second valve disposed within said first refrigerant circuit selectively admitting refrigerant from one of said first refrigerant circuit and said second refrigerant circuit, and discharging admitted refrigerant to said second heat exchanger;

a third valve disposed within said first refrigerant circuit, selectively admitting refrigerant from one of said first refrigerant circuit and said second refrigerant circuit, and discharging admitted refrigerant into a conduit conducting the refrigerant to a fourth valve;

said at least one bypass control valve comprising a fourth valve disposed within said first refrigerant circuit, admitting refrigerant flowing from said third valve, and selectively diverting the refrigerant to a conduit conducting the refrigerant to one of said first heat exchanger and said bypass conduit, and a fifth valve disposed within said first refrigerant circuit, selectively admitting refrigerant flowing from one of said first heat exchanger and said bypass circuit, and discharging the refrigerant to a conduit conducting refrigerant to said heater;

a sixth valve disposed within said first refrigerant circuit, selectively admitting refrigerant from one of a conduit conducting refrigerant from said heater, and a conduit of said second refrigerant circuit conducting refrigerant from said second heat exchanger, said sixth valve discharging refrigerant to a conduit conducting refrigerant to said compressor suction side;

an electrical control circuit controlling said heater, said fourth valve and said fifth valve; and a thermostat disposed in operative relation to ambient air, including a switch responsive to a predetermined critical temperature, said switch controlling said control circuit to energize said heater and to control said fourth valve and said fifth valve to cause refrigerant flowing within said first refrigerant circuit to flow to a conduit conducting the refrigerant to one of said first heat exchanger and said bypass conduit, and then to flow to said heater.

7. The heat pump according to claim 6, said heater comprising:

means defining a liquid chamber partially filled with liquid and a threaded heater hole and a threaded access hole;

an electric heater element assembly having threads corresponding to said heater hole, said heater element assembly threadedly and removably installed within said heater, and having an electric heating element disposed within said liquid chamber and immersed in said liquid;

a plug having threads corresponding to said threaded access hole, for providing access to said liquid chamber for filling the same by removing said plug; and means defining a refrigerant chamber disposed in heat exchange relation to said liquid chamber and in fluid communication with said first refrigerant circuit, whereby refrigerant within said first refrigerant circuit passes through said refrigerant chamber and absorbs heat generated by said heating element.

8. A heat pump having supplementary heat comprising:

a compressor for compressing refrigerant, having a suction side and a discharge side;

a first heat exchanger disposed in heat exchange relation with ambient air;

a second heat exchanger disposed in heat exchange relation with air of an occupied space;

a bypass conduit disposed in parallel with said first heat exchanger;

a heater having an electric heating element, in heat exchange relation with refrigerant flowing in a refrigerant circuit, comprising:

means defining a liquid chamber partially filled with liquid and a threaded heater hole and a threaded access hole;

an electric heater element assembly having threads corresponding to said heater hole, said heater element assembly threadedly and removably installed within said heater, and having an electric heating element disposed within said liquid chamber and immersed in said liquid;

a plug having threads corresponding to said access hole, for providing access to said liquid chamber for filling the same by removing said plug; and means defining a refrigerant chamber disposed in heat exchange relation to said liquid chamber and in fluid communication with said first refrigerant circuit, whereby refrigerant within said first refrigerant circuit passes through said refrigerant chamber and absorbs heat generated by said heating element;

a first refrigerant circuit for heating an occupied space, comprising conduits conducting refrigerant from said compressor discharge side to said second heat exchanger, then conducting refrigerant selectively to one of said second heat exchanger and said bypass conduit, then conducting refrigerant to said heater, and then conducting refrigerant to said compressor suction side;

at least one bypass control valve controlling said first refrigerant circuit to conduct refrigerant from said compressor discharge side selectively to one of said first heat exchanger and said bypass conduit;

a second refrigerant circuit for cooling the occupied space, comprising conduits conducting refrigerant from said compressor discharge side to said first heat exchanger, then conducting refrigerant to said second heat exchanger, and then conducting refrigerant to said compressor suction side;

a first valve disposed within said first refrigerant circuit after said compressor discharge side, for selectively diverting refrigerant from said first refrigerant circuit to said second refrigerant circuit;

a second valve disposed within said first refrigerant circuit selectively admitting refrigerant from one of said first refrigerant circuit and said second refrigerant circuit, and discharging admitted refrigerant to said second heat exchanger;

a third valve disposed within said first refrigerant circuit, selectively admitting refrigerant from one of said first refrigerant circuit and said second refrigerant circuit, and discharging admitted refrigerant into a conduit conducting the refrigerant to a fourth valve;

said at least one bypass control valve comprising a fourth valve disposed within said first refrigerant circuit, admitting refrigerant flowing from said third valve, and selectively diverting the refrigerant to a conduit conducting the refrigerant to one of said first heat exchanger and said bypass conduit, and a fifth valve disposed within said first refrigerant circuit, selectively admitting refrigerant flowing from one of said first heat exchanger and said bypass circuit, and discharging the refrigerant to a conduit conducting refrigerant to said heater;

a sixth valve disposed within said first refrigerant circuit, selectively admitting refrigerant from one of a conduit conducting refrigerant from said heater, and a conduit of said second refrigerant circuit conducting refrigerant from said second heat exchanger, said sixth valve discharging refrigerant to a conduit conducting refrigerant to said compressor suction side;

an electrical control circuit controlling said heater, said fourth valve and said fifth valve; and a thermostat disposed in operative relation to ambient air, including a switch responsive to a predetermined critical temperature, said switch controlling said control circuit to energize said heater and to control said fourth valve and said fifth valve to cause refrigerant flowing within said first refrigerant circuit to flow to a conduit conducting the refrigerant to one of said first heat exchanger and said bypass conduit, and then to flow to said heater.

* * * * *